(12) United States Patent
Chaney

(10) Patent No.: US 7,739,502 B2
(45) Date of Patent: Jun. 15, 2010

(54) LOCALIZATION DETERMINATION PROCESS FOR 1394 SERIAL BUS

(75) Inventor: John W. Chaney, Gilroy, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1190 days.

(21) Appl. No.: 11/329,690

(22) Filed: Jan. 10, 2006

(65) Prior Publication Data

US 2007/0168661 A1   Jul. 19, 2007

(51) Int. Cl.
*H04L 9/00* (2006.01)
*H04L 12/26* (2006.01)

(52) U.S. Cl. .................. 713/168; 370/249; 375/221

(58) Field of Classification Search ............ 375/221
See application file for complete search history.

(56) References Cited

U.S. PATENT DOCUMENTS

| | | | | |
|---|---|---|---|---|
| 6,593,937 B2 * | 7/2003 | Ludtke et al. | ................ | 345/629 |
| 6,633,547 B1 * | 10/2003 | Akatsu et al. | ................ | 370/255 |
| 7,574,747 B2 * | 8/2009 | Oliveira et al. | ................ | 726/29 |
| 2003/0028652 A1 * | 2/2003 | Bardini et al. | .............. | 709/229 |
| 2005/0027984 A1 * | 2/2005 | Saito et al. | .................. | 713/168 |
| 2005/0147108 A1 * | 7/2005 | Nakano | ..................... | 370/401 |
| 2005/0273608 A1 * | 12/2005 | Kamperman | ................ | 713/169 |
| 2007/0009232 A1 * | 1/2007 | Muraki et al. | ................. | 386/95 |
| 2008/0168272 A1 * | 7/2008 | Saito et al. | .................. | 713/171 |

\* cited by examiner

*Primary Examiner*—Matthew B Smithers
(74) *Attorney, Agent, or Firm*—Kenneth L. Sherman, Esq.; Michael Zarrabian, Esq.; Myers Andras Sherman LLP

(57) ABSTRACT

A localization process in a network of source devices and sink devices on a 1394 bus, is performed by a source device while it is communicating to a sink device, which determines local network links from nonlocal ones. An actual round trip time calculation is performed only by the source device and the sink device can be relatively passive. The duties of the sink device are performed in hardware and involve (trivially) modifying the received message while moving the message from the input isochronous channel buffer to the output isochronous channel buffer.

28 Claims, 3 Drawing Sheets

LOCALIZATION DETERMINATION PROCESS FOR 1394 SERIAL BUS

FIELD OF THE INVENTION

The present invention relates to communication over 1394 serial bus, and in particular to a localization determination process for 1394 serial bus.

BACKGROUND OF THE INVENTION

The 5 C group of companies have developed DTCP/IP method that uses IP and asynchronous communications to accomplish localization determination. The IDB Forum developed a similar method for communication between source and sink devices in a 1394 network, which uses AV/C asynchronous communication and involves a sink device to cryptographically manipulate a message during round trip time measurements.

A typical 1394 includes at least one source device and at least one sink device among many devices connected to a 1394 bus. A localization process determines that the communication loop between the source device is within the network. Conventional methods (e.g., DTCP/IP), measure round trip time using software stacks, and so the majority of the time measured is really time spent in nodes of switching from one of software stack to another, rather than time data travels on the bus.

BRIEF SUMMARY OF THE INVENTION

In one embodiment, the present invention provides a procedure to be performed by a source device while it is communicating to a sink device, which determines local network links from nonlocal is needed.

In one implementation of the present invention, in a network of source and sink devices interconnected to a 1394 bus, a localization method comprises the steps of: a source device generating an encrypted message and sending the encrypted message to a sink device over the 1394 bus while noting the time the message is sent; the sink device receiving the message, decrypting the content of the message and based on the decrypted content sending an encrypted reply message to the source device over a the 1394 bus; the source device receiving the reply message, noting the time of receipt, wherein the difference between the sent time and receipt time indicated round trip time between the source device and the sink device. The source device and the sink device engage in a Diffie-Hellman key exchange process for generating the shared secret key for the encryption and decryption processes.

Preferably, the source device decrypts the reply content and determines if the reply content meets certain criteria, and if so, determines difference between the sent time and receipt time as the measured round trip time between the source device and the sink device. The source device compares the measured time to a threshold, such that if the measured time is greater than the threshold then the sink device is not local to the source device, otherwise the sink device is local to the source device.

Preferably, the source device sends the message to the sink device via a forward isochronous channel; and the sink device sends the reply message to the source device via a reverse isochronous channel. Preferably, the localization process include initially establishing a forward isochronous channel between the source device and the sink device on the 1394 bus for message communications from the source device to the sink device; and establishing a reverse isochronous channel between the sink device and the source device on the 1394 bus for message communications from the sink device to the source device.

In another embodiment, the present invention provides a localization system for a network of source and sink devices interconnected to a 1394 bus, comprising: a message generator that generates an encrypted message and sends the encrypted message from source device to a sink device over the 1394 bus while noting the time the message is sent; a message receiver for the sink device that receives the message, decrypts the content of the message and based on the decrypted content sends an encrypted reply message to the source device over a the 1394 bus; and a message checker that receives the reply message for the source device, notes the time of receipt, wherein the difference between the sent time and receipt time indicated round trip time between the source device and the sink device. Preferably, the source device sends the message to the sink device via a forward isochronous channel; and the sink device sends the reply message to the source device via a reverse isochronous channel.

The source device decrypts the reply content and determines if the reply content meets certain criteria, and if so, determines difference between the sent time and receipt time as the measured round trip time between the source device and the sink device. The source device compares the measured time to a threshold, such that if the measured time is greater than the threshold then the sink device is not local to the source device, otherwise the sink device is local to the source device.

These and other features, aspects and advantages of the present invention will become understood with reference to the following description, appended claims and accompanying figures.

DETAILED DESCRIPTION OF THE INVENTION

The purpose of localization is to determine that the communication loop between two devices is within a network (e.g., a home network), and does not extend outside that network. The context is that the source device is the new device that contains protected content and which needs to perform the localization procedure (e.g., the sink device is most probably an HDTV and the source device is a DVD player).

An example 1394 network includes at least one source device (e.g., DVD player) and at least one sink device (e.g., HDTV) among many devices connected to a 1394 bus. Conventional methods measure round trip time using software stacks and asynchronous communication, and so the majority of the time measured is really time spent in nodes of switching from one stack of software to another, rather than time data travels on the bus. An example localization process according to the present invention determines that the communication loop between the source device is within the network, by measuring the actual round trip communication time of a message and reply between the two devices on the 1394 bus using isochronous communications.

Figure 1:
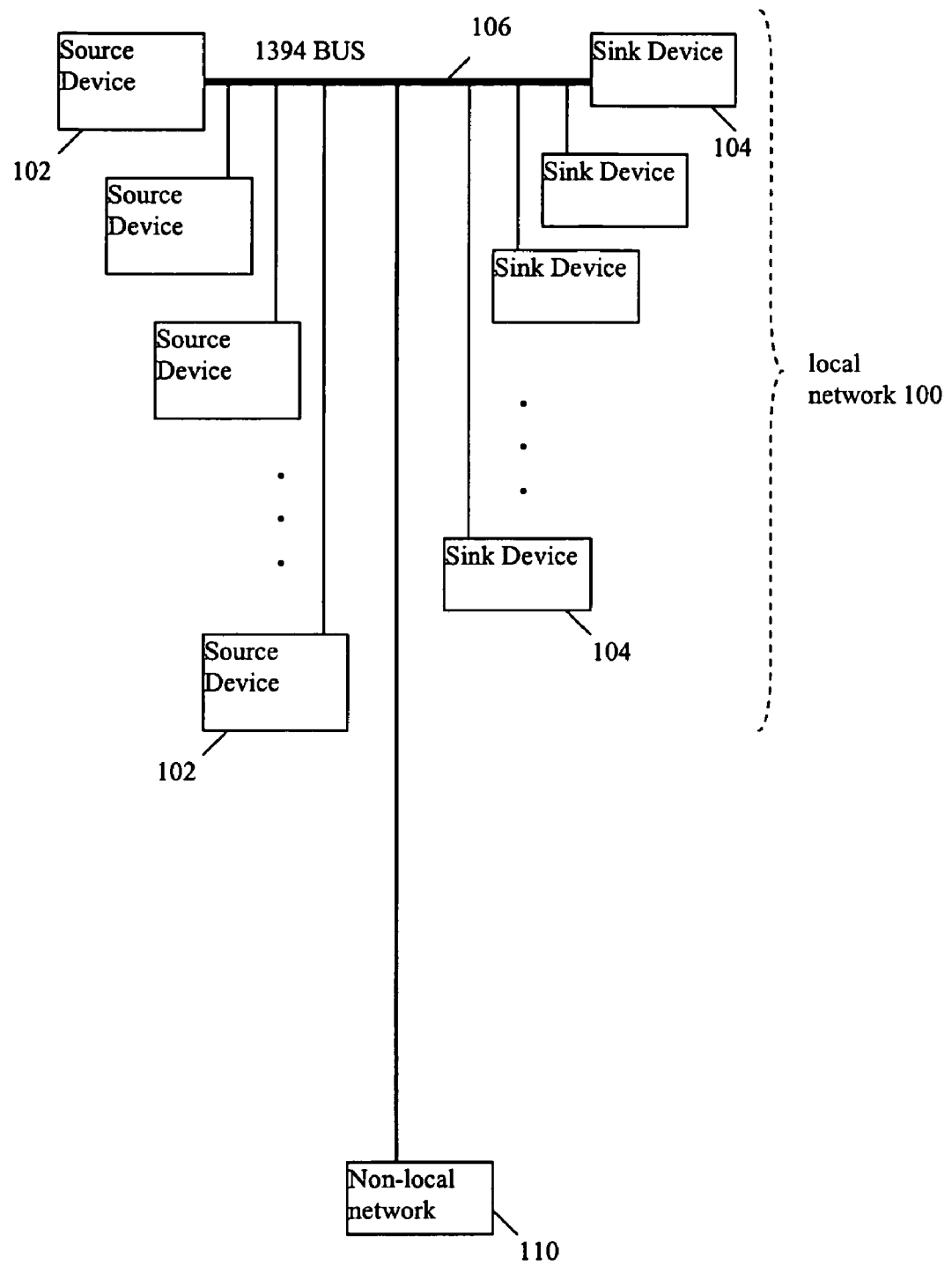
FIG. 1 shows an example 1394 network implementing an embodiment of a localization process, according to an embodiment of the present invention.

FIG. 1 shows an example 1394 network 100 including at least one source device 102 (e.g., DVD player) and at least one sink device 104 (e.g., HDTV) connected to a 1394 bus 106. The devices 102 and 104 are on the local network, which is connected to a non-local network 110. In one example implementation of the localization process according to the present invention, a mechanism is provided to measure said round trip time. There are two types of channels on 1394, asynchronous and isochronous. In asynchronous channels a fairness algorithm decides access to the bus, wherein such access is on a best effort basis not a guaranteed basis of delivery, so a lot of time is spent waiting using asynchronous methods. This is the current Digital Transmission Content Protection (DTCP) over IP method which uses just IP methodology and not any kind of hardware for roundtrip time measurement, as special functionality like 1394 isochronous channels have for guaranteed quality of service with packet delivery. The 1394 isochronous channels have very low latency and jitter properties compared with the 1394 asynchronous channels and conventional Ethernet communications. The isochronous channels are a special type of bus clock synchronous transmission that allocates a time window at each bus clock to the channel data transmission. This is a form of Time Division Multiplexing Algorithm (TDMA) and it insures the capability for a constant bit rate for the transmission.

As such, the example implementation of the present invention involves establishing a forward isochronous channel from the source device to the sink device, and then also a reverse isochronous channel from the sync device back to the source device for a small amount of data, wherein the round trip time measurement only has to be measured once in a while (e.g., once in every 40 hours perhaps), to allow the devices to operate. As a result, the overhead is very little and the amount of data transmitted is very little, as such the hardware used for setting up the isochronous channels is well worth it.

Figure 2:
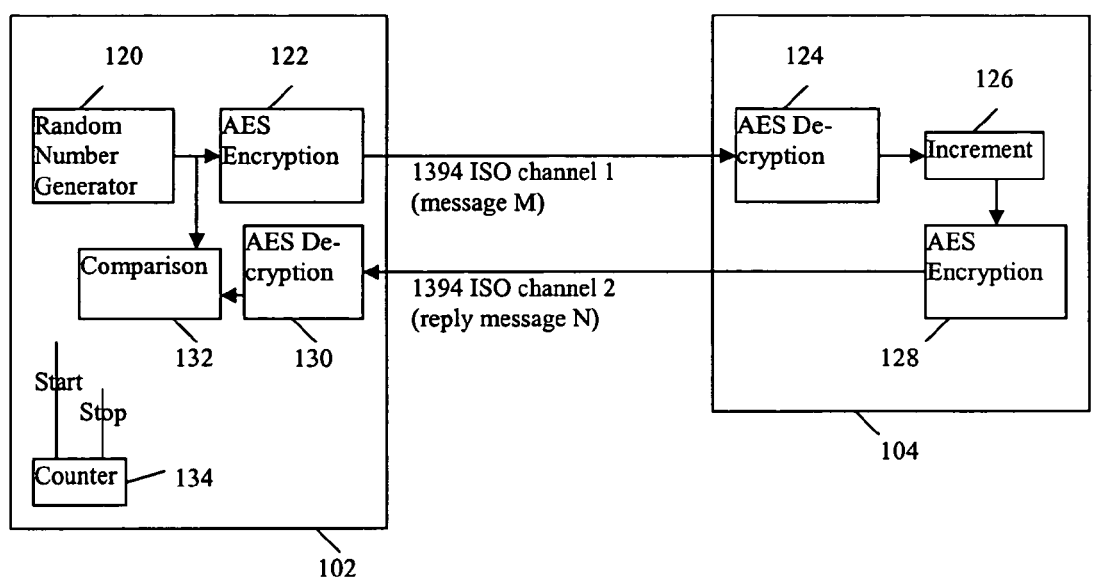
FIG. 2 shows an example embodiment of localization process between a sink device a source device in the 1394 network of FIG. 1, according to an embodiment of the present invention.

FIG. 2 shows an example embodiment of localization process between a source device 102 and a sink device 102 in the 1394 network of FIG. 1, according to an embodiment of the present invention. Initially, an isochronous channel (1394 ISO channel 1) is established from the source device 102 to the sink device 104, and then also a reverse isochronous channel (1394 ISO channel 2) is established from the sink device 104 back to the source device 102, on the 1394 bus. The use of channel numbers here is merely logical and independent of the physical channel numbering established by the Isochronous Resource Manager (IRM) and the 1394 bus infrastructure. Once the localization process is complete then the reverse channel 2 is not used again and may be deallocated. The reverse channel 2 must be reestablished for each localization determination test. Then, from the source device 102, a random number generator 120 generates random number R (e.g., on the order of 256 bits nonce). At the same time a counter (timer) 134 is started that is accurate to e.g. one nanosecond resolution. The random number R is encrypted in an Advanced Encryption Standard (AES) encryption unit 122 and then sent to the sink device 104 over the isochronous (ISO) channel 1 on the 1394 bus.

When the sink device 104 receives the encrypted random number, an AES decryption unit 124 decrypts the number to obtain the original random number R. The decrypted random number R is incremented (e.g., by n=1) in an incrementer 126 to obtain R+n, and AES encrypted in an AES encryption unit 128, and sent back to the source device 102 via the reverse ISO channel 2 on the 1394 bus. At the source device 102, the received encrypted number is decrypted in an AES decryption unit 130 to obtain R+n, and compared by a comparator 132 to the original random number R generated by the random number generator and placed in a register. If the received number R+n is within the expected increment n of the original number R, then the counter 134 is stopped. The increment n, and the encryption/decryption process, are proof to the source device 102 that the proper sink device 104 received and incremented the random number, which indicates that the round trip time to the correct sink device is being measured.

The source device 102 goes through a Diffie-Hellman key exchange process with the sink device 104. The process generates a unique shared key (e.g., a 128 bit key) that is known only to the sink device 104 and the source device 102, and is used in the AES encryption/decryption steps above. The source device 102 generates a different random number and sends to different sink devices 104, and the source device 102 then checks for return of properly incremented random number with proper key exchange from each target sink device 104 to ensure that the proper sink device received and read the random number from the source device, and sent back a proper reply.

When stopped, the counter 134 contains a count of the number of microseconds for the round trip time (RTT) between the source and sink devices 102, 104. The counter value indicates the actual round trip time between the source device 102 and the sink device 104 on the 1394 bus. If the count is less than e.g. 250 microseconds for a local bus, then the sink device 104 is local to the source device 102, otherwise, the sink device 104 is not local to the source device 102. As those skilled in the art will recognize, other values besides 250 microseconds can be utilized depending on application. In one example, a DVD player as a source device includes the above mechanism and to play DVD's to a television set (sink device). The DVD player checks out the localization of the television set.

The above value 250 microseconds is the timing interval on a 6 bit address 1394 wherein the bus is clocked every 125 microseconds. When messages between source and sink devices go through bridges (e.g., 1394.1 bridges), probably the round trip time delay per bridge for isochronous data will be on the order of 250 microseconds. As such, if a message from a source device goes through bridges to arrive at a sink device and back to the sink device, then using 16 bit addressing on 1394 B each bridge causes a RTT time increment of 250 microseconds. So the localization process is well under the target that the IP only processes require for delivering round trip data. The current example localization threshold target for DTCP/IP is 7 milliseconds and interested parties would like an improved target value of 2 milliseconds.

The encryption/decryption steps between the source and sink devices actually pairs each source-sink device RTT measurement process. Each source and the sink device share a unique secret (e.g., key exchange) that actually uniquely identifies the sink device target from the source device. The source device 102 expects specified increments and key exchange from different sink devices 104, which enables the source device 102 to ensure that the round trip time to the correct sink device 104 is being measured in each case.

Though in the above example a random number is generated in the source device and then incremented in the sink device to indicate to the source device that the sink device received and sent back the random number, any other authenticated action that shows the sink device received and read a message by the source device, and sent a response back, can be utilized to measure the round trip time.

The above process occurs periodically between each sink and source device, or if it has not been performed in a period of time, then it takes place before any communications can occur between the sink and source devices.

As those skilled in the art will recognize, the components shown in FIG. 2 are logical functions that can be either implemented in the devices 102, 104, or separate from the devices 102, 104 in the 1394 network. The functional components 120, 122, 130, 132 and 134 can be part of a message generator/checker, and the functional components 124, 126 and 128 can be part of a message receiver. Further, instead of starting/stopping a timer, the source device can time stamp the message being sent to the sink device, and upon receipt of a reply message (which may include said time stamp) from the sink device, the sink device notes the time difference between the time stamp and the receipt of the reply as a measure of the RTT. Further, the random number R can be decremented by n instead of incremented by n, etc.

Figure 3:
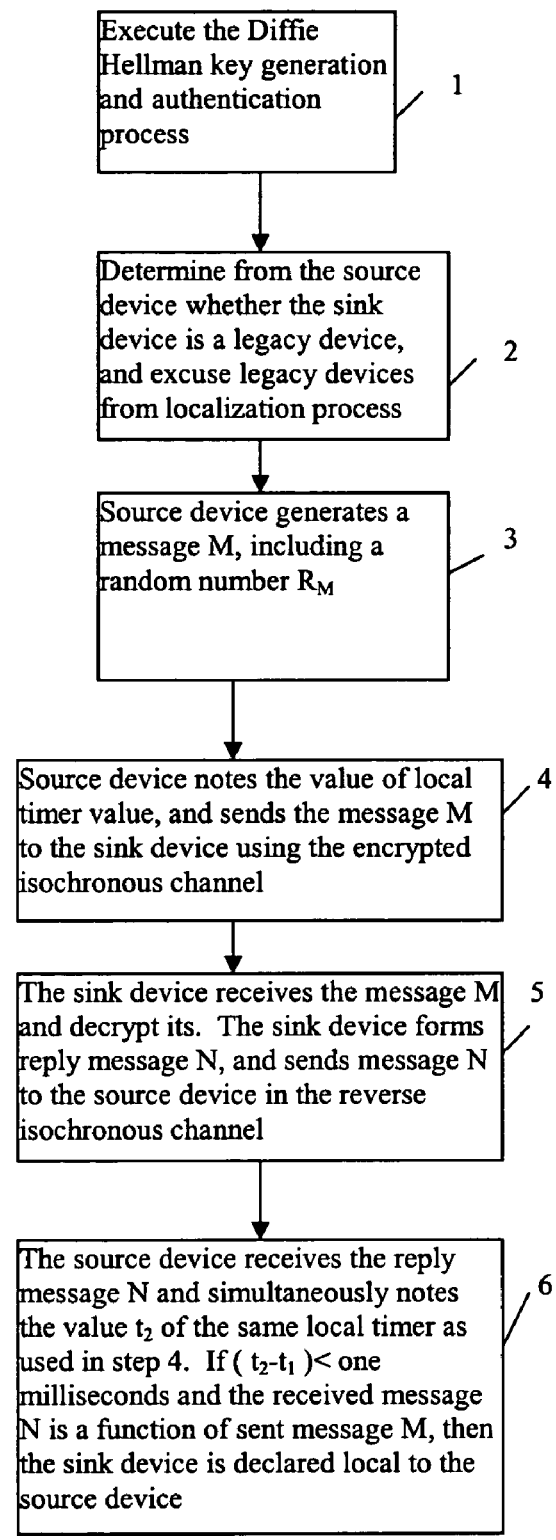
FIG. 3 shows an example flowchart of an embodiment of the steps of localization process between a sink device a source device, according to an embodiment of the present invention.

FIG. 3 shows an example flowchart of another embodiment of the steps of localization process between the source device 102 and the sink device 104, according to an embodiment of the present invention. Referring to FIG. 3, an embodiment of a localization process to determine that the communication loop between devices 102 and 104 within the 1394 (local) network, comprises the steps of:

1. The first step in the procedure is to execute the Diffie-Hellman key generation and authentication process 2. The second step is to determine from the source device whether the sink device is a legacy device. This is done by determining if the sink device supports this method of localization, if not then the sink device is a legacy device and is excused from the localization procedure (i.e., the localization process for the legacy sink device ends).

3. Otherwise, the process proceeds to the third step to complete the localization determination procedure, wherein in the third step the source device generates a message M at a local timer value $t_1$. The message M includes, for example, a random number $R_M$. In one example, the value $t_1$, can be placed in the message M, to be returned in reply message N, and used to calculate the RTT time as in step 6 below. The time counter is zeroed simultaneously with the transmission of the initial message on channel 1. As a result no difference needs to be generated because t1=0, then RTT=t2−t1=t2.

4. The fourth step is for the source device to note the value of local timer value accurate to at least 1 microsecond, preferably one nanosecond, and capable of counting to $2^{64}-1$ before overflow, and sends the message M to the sink device using the encrypted isochronous channel 1. This channel will deliver encrypted content over the 1394 link.

5. The fifth step is that the sink device must receive the content of message M and decrypts it. The sink device uses the contents received to form reply message N (e.g., as described above). Then, the sink device sends reply message N to the source device in the isochronous channel 2 on the 1394 link.

6. The sixth step is that the source device receives the reply message N and simultaneously notes the value of the same local timer (e.g., at time $t_2$) as used in step 4. For example, if $(t_2-t_1)<1$ millisecond threshold and the received message N is e.g. the trivial and predetermined function of the sent message M, then the sink device (sink node 104) is declared local to the source device (source node 102). The 1 millisecond threshold above is an example, and as those skilled in the art will recognize, other threshold values can also be utilized based on the application. This completes the localization determination process between the source device and the sink device.

In one embodiment of the present invention, the duty of the sink device is to modify the received message (e.g., in a trivial and predetermined way such as increment by 1), while moving it from the input isochronous channel buffer to the output (return) isochronous channel buffer.

During the localization process of measuring the round trip time (RTT), only the isochronous channels are used. Because these isochronous channels (isoc) have low latency and jitter and the sink device side turnaround is performed in hardware, then the time measurement is representative of message travel on the 1394 bus between the sink and source devices.

A localization process according to the present invention is useful in many applications. For example, the MPAA and the DVD Forum would like to allow fair use of protected content in a home network but only if the content can be localized to the home. As such, in one example the present invention provides a localization process according to the present invention that is performed by a source device while it is communicating to a sink device that determines local network links from nonlocal.

While the present invention is susceptible of embodiments in many different forms, there are shown in the drawings and have herein been described in detail, preferred embodiments of the invention with the understanding that the present disclosure is to be considered as an exemplification of the principles of the invention and is not intended to limit the broad aspects of the invention to the embodiments illustrated. The aforementioned example architectures above according to the present invention can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. In a network of source and sink devices interconnected to a 1394 bus, a localization method comprising:
   a source device generating message content;
   the source device encrypting the message content;
   the source device sending the message with encrypted content to the sink device over the 1394 bus, and concurrently starting a timer;
   the sink device receiving the message and decrypting the content;
   the sink device generating reply content based on the decrypted content;
   the sink device encrypting the reply content;
   the sink device sending the reply message with encrypted reply content to the source device over the 1394 bus;
   the source device receiving the reply message and decrypting the content;
   the source device checking the decrypted reply content such that if the decrypted reply content meets certain criteria, the source device stops the timer, wherein the time measured by the timer indicates round trip time between the source device and sink device on the 1394 bus.

2. The method of claim 1, further comprising:
   comparing the measured time to a threshold, such that if the measured time is greater than the threshold then the sink device is not local to the source device, wherein the source device generating the message content further includes the source device generating a random number R and placing the random number R in the message, wherein the sink device generating reply content based on the decrypted content further includes the sink device incrementing the received number R by n, and wherein the source device checking the decrypted reply content further includes the source device checking to determine if the decrypted reply content includes the value R incremented by n.

3. The method of claim 2, wherein if the decrypted reply content includes the value R changed by n, then the source device stops the timer.

4. The method of claim 2, wherein n further comprises an expected increment.

5. The method of claim 2, wherein the random number R is encrypted in an Advanced Encryption Standard encryption unit.

6. The method of claim 2, wherein the source device goes through a Diffie-Hellman key exchange process with the sink device.

7. The method of claim 1, further comprising initially:
establishing a forward isochronous channel between the source device and the sink device on the 1394 bus for message communications from the source device to the sink device;
establishing a reverse isochronous channel between the sink device and the source device on the 1394 bus for message communications from the sink device to the source device.

8. The method of claim 7, wherein:
the source device sends the message to the sink device via the forward isochronous channel; and
the sink device sends the reply message to the source device via the reverse isochronous channel.

9. In a network of source and sink devices interconnected to a 1394 bus, a localization method comprising:
a source device generating an encrypted message and sending the encrypted message to a sink device over the 1394 bus while concurrently noting the time the message is sent;
the sink device receiving the message, decrypting the content of the message and based on the decrypted content sending an encrypted reply message to the source device over the 1394 bus;
the source device receiving the reply message, noting the time of receipt, wherein the difference between the sent time and receipt time indicated round trip time between the source device and the sink device.

10. The method of claim 9 wherein:
the source device sends the message to the sink device via a forward isochronous channel; and
the sink device sends the reply message to the source device via a reverse isochronous channel.

11. The method of claim 10 further comprising:
the source device decrypting the reply content and determining if the reply content meets certain criteria, and if so, determining the difference between the sent time and receipt time as the measured round trip time between the source device and the sink device.

12. The method of claim 11 further comprising:
comparing the measured time to a threshold, such that if the measured time is greater than the threshold then the sink device is not local to the source device, otherwise the sink device is local to the source device.

13. The method of claim 9 further comprising:
establishing a forward isochronous channel between the source device and the sink device on the 1394 bus for message communications from the source device to the sink device;
establishing a reverse isochronous channel between the sink device and the source device on the 1394 bus for message communications from the sink device to the source device.

14. The method of claim 13 wherein the sink device modifies the received message while moving it from the incoming isochronous channel buffer to the outgoing isochronous channel buffer.

15. In a network of source and sink devices interconnected to a 1394 bus, a localization method comprising:
a source device performing a localization for each of a plurality of sink devices, for each of the plurality of sink devices the localization process including:
the source device generating an encrypted message and sending the encrypted message to a sink device over the 1394 bus while concurrently noting the time the message is sent;
the sink device receiving the message, decrypting the content of the message and based on the decrypted content sending an encrypted reply message to the source device over a the 1394 bus;
the source device receiving the reply message, noting the time of receipt, wherein the difference between the sent time and receipt time indicated round trip time between the source device and the sink device.

16. The method of claim 15 wherein the sink device modifies the received message while moving it from the incoming isochronous channel buffer to the outgoing isochronous channel buffer.

17. The method of claim 16 further comprising:
the source device decrypting the reply content and determining if the reply content meets certain criteria, and if so, determining difference between the sent time and receipt time as the measured round trip time between the source device and the sink device.

18. The method of claim 15 wherein:
the source device sends the message to the sink device via a forward isochronous channel; and
the sink device sends the reply message to the source device via a reverse isochronous channel.

19. The method of claim 18 further comprising:
comparing the measured time to a threshold, such that if the measured time is greater than the threshold then the sink device is not local to the source device, otherwise the sink device is local to the source device.

20. The method of claim 15 further comprising:
establishing a forward isochronous channel between the source device and the sink device on the 1394 bus for message communications from the source device to the sink device;
establishing a reverse isochronous channel between the sink device and the source device on the 1394 bus for message communications from the sink device to the source device.

21. A localization system for a network of source and sink devices interconnected to a 1394 bus, comprising:
a message generator that generates an encrypted message and sends the encrypted message from source device to a sink device over the 1394 bus while concurrently noting the time the message is sent;
a message receiver for the sink device that receives the message, decrypts the content of the message and based on the decrypted content sends an encrypted reply message to the source device over a the 1394 bus;

a message checker that receives the reply message for the source device, notes the time of receipt, wherein the difference between the sent time and receipt time indicated round trip time between the source device and the sink device.

22. The system of claim 21 wherein:

the message generator sends the message to the sink device via a forward isochronous channel; and the message receiver sends the reply message to the source device via a reverse isochronous channel.

23. The system of claim 21 wherein the encrypted message further comprises a random number R, wherein the encrypted reply message further comprises the received number R incremented by n, wherein the message checker decrypts the reply content and determines if the reply content meets certain criteria, and if so, determines difference between the sent time and receipt time as the measured round trip time between the source device and the sink device.

24. The system of claim 23 wherein the message checker Compares the measured time to a threshold, such that if the measured time is greater than the threshold then the sink device is not local to the source device, otherwise the sink device is local to the source device.

25. The system of claim 23 wherein the source device first determines if the sink device is a legacy device, and if so, the source device excuses the sink device from the localization process.

26. The system of claim 21 further comprising:

a forward isochronous channel between the source device and the sink device on the 1394 bus for message communications from the source device to the sink device;

a reverse isochronous channel between the sink device and the source device on the 1394 bus for message communications from the sink device to the source device.

27. The system of claim 21 wherein the sink device modifies the received message while moving it from the incoming isochronous channel buffer to the outgoing isochronous channel buffer.

28. In a network of source and sink devices interconnected to a 1394 bus, a localization method comprising:

executing a Diffie Hellman key generation and authentication process;

determining from a source device whether a sink device is a legacy device, and if the sink device is the legacy device, excusing the legacy devices from a localization process;

the source device generating a message M, wherein the message M further comprises a random number R;

the source device sending the message M to the sink device using an encrypted isochronous channel and concurrently noting a first value of a local timer;

the sink device receiving the message M and decrypting the content;

the sink device generating reply message N, the sink device sending message N to the source device n a reverse isochronous channel;

the source device receiving the reply message N and simultaneously noting a second value of the local timer;

determining whether the difference between the first value of the local timer and a second value of a local time is below a threshold;

determining whether reply message N is a function of message M;

if the difference between the first value of the local timer and a second value of a local time is below the threshold and if the reply message N is a function of message M, declaring the sink device local to the source device.

* * * * *